Jan. 22, 1924.
W. F. HOLEKA
AIRPLANE CONSTRUCTION
Filed Jan. 4, 1922
1,481,555
2 Sheets-Sheet 1
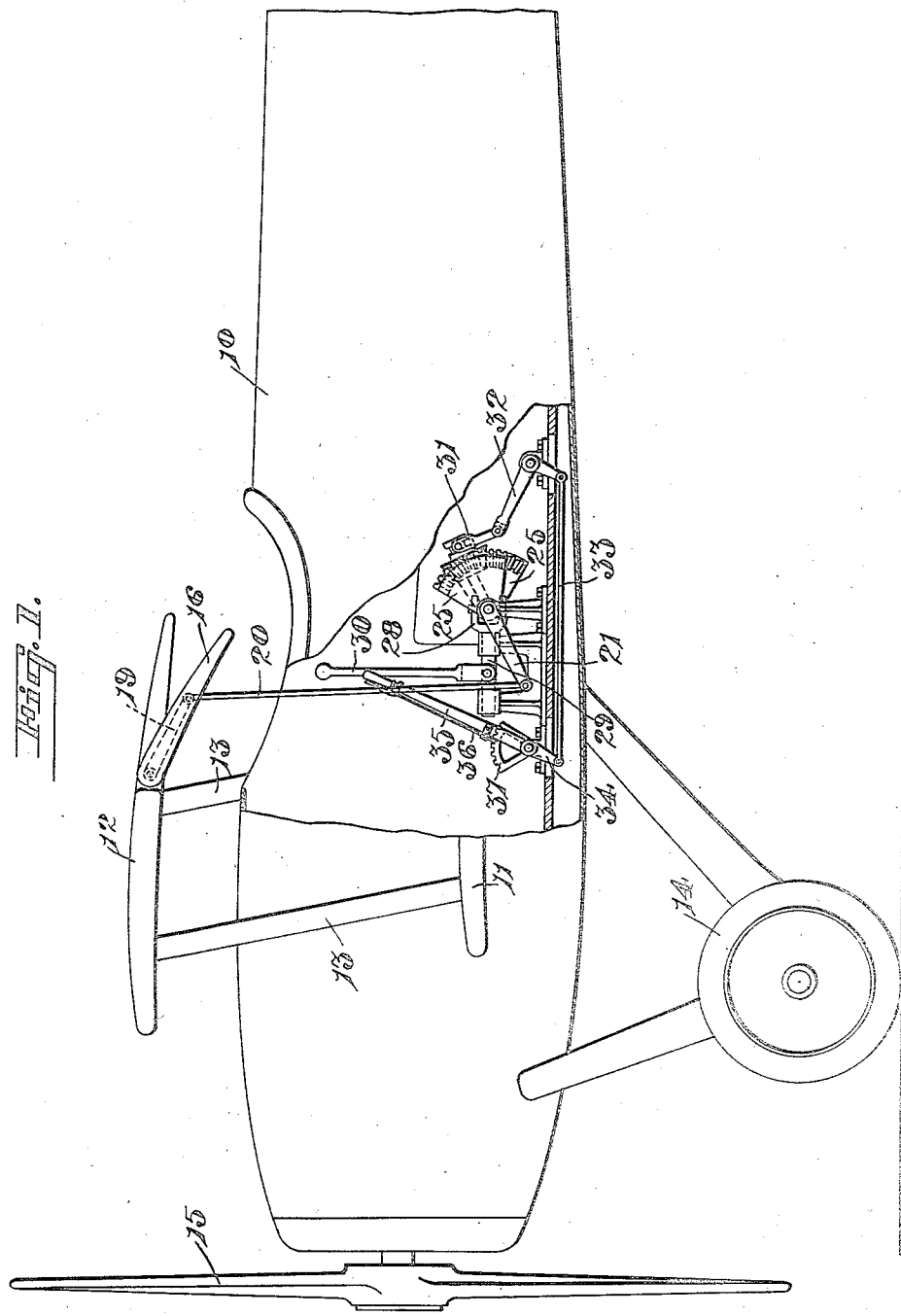
INVENTOR.
WILLIAM F. HOLEKA.
BY Chas. E. Townsend
ATTORNEY.

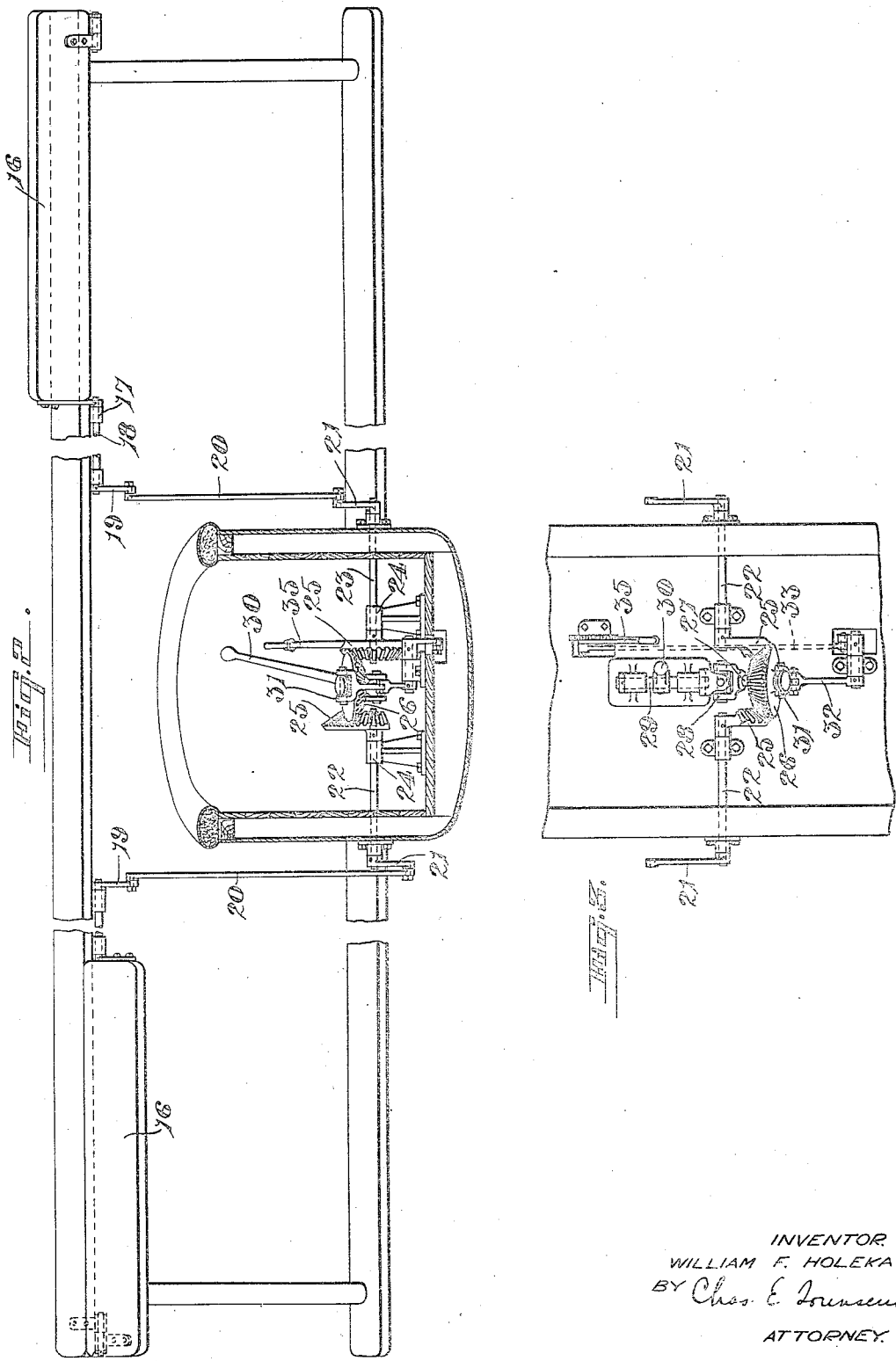

Patented Jan. 22, 1924.

1,481,555

UNITED STATES PATENT OFFICE.

WILLIAM F. HOLEKA, OF SACRAMENTO, CALIFORNIA.

AIRPLANE CONSTRUCTION.

Application filed January 4, 1922. Serial No. 526,876.

*To all whom it may concern:*

Be it known that I, WILLIAM F. HOLEKA, a citizen of Czechoslovakia, residing at Sacramento, in the county of Sacramento and State of California, have invented new and useful Improvements in Airplane Constructions, of which the following is a specification.

This invention relates to airplane construction, and pertains to means for changing the camber of the wings.

It is the principal object of the present invention to provide means whereby the camber of airplane wings may be varied, thus controlling the landing speed of the airplane, facilitating in the landing operation, and permitting a machine of greater capacity, with relatively smaller wing area and increased speed range to be built.

The present invention contemplates the use of ailerons supplementing the wing or wings of an airplane, the said ailerons being disposed at each side of the longitudinal axis of the machine and being provided with means whereby they may be simultaneously moved in opposite directions, or simultaneously moved in the same direction.

The invention is illustrated by way of example in the accompanying drawings, in which:

Fig. 1 is a fragmentary view in side elevation, with parts broken away, showing a portion of an airplane, and particularly disclosing the present invention.

Fig. 2 is a view in transverse section through the fuselage showing the ailerons and their control.

Fig. 3 is a view in plan disclosing the control mechanism.

Referring more particularly to the drawing, 10 indicates the fuselage of an airplane, provided with wings 11 and 12. These wings are reinforced by struts 13. A suitable landing gear 14 is also supplied, as well as a propeller 15 driven by a power plant not shown in the drawing. For the purpose of improving the performance of an airplane, and particularly facilitating in landing, it has been found that a structure which will increase the maximum lift coefficient is desirable, and this result may be obtained by varying the camber of the wings, as in the present instance when ailerons 16 are made part of the upper wings. These members may be vertically swung as required, and if desired may be simultaneously swung in opposite directions to control the airplane laterally.

The ailerons are pivotally supported by bearings 17, preferably disposed in the rear of the rear wing beam. These bearings receive operating shafts 18, the shafts being in alignment, and preferably terminating at opposite sides of the fuselage. An operating lever 19 is secured to each of the shafts. These levers carry pitman rods 20, which extend downwardly to crank arms 21. The crank arms 21 are fixed to the outer ends of longitudinally aligned shafts 22 and 23. These shafts extend through the side walls of the fuselage, and into the cock-pit. Suitable bearings 24 are provided to rotatably support the shafts. The inner end of each of the shafts is fitted with a bevelled gear segment 25. These segments are spaced a distance from each other and are both in mesh with an intermediate bevel pinion 26. The pinion 26 is rotatably supported upon a vertically swinging shaft 27. This shaft is secured by a universal joint structure 28 to a horizontally extending lever shaft 29. A control lever 30 is secured to this shaft and is designed to swing transversely of the airplane, while rotating the shaft. This rotation of the shaft will produce a like rotation of the bevel pinion 26 and will cause opposite swinging movement of the bevel gear segments 25.

Vertical swinging movement of the shaft 27 is brought about by a shifting yoke 31 which is secured at the end of a bell crank 32. The opposite arm of the bell crank is fitted with a connecting rod 33 extending upwardly, and preferably beneath the floor of the cock-pit to connect with a lever arm 34 of a shifting hand lever 35. This hand lever is fitted with a latch means 36 by which it may be locked in a desired position relative to a toothed segment 37.

In operating the present invention it will be assumed that both ailerons are in the same position relative to each other, in which case the lever 30 will stand vertically. When it is desired to simultaneously move both ailerons in unison, the hand lever 35 is moved relative to the segment 37 and will act through the connecting rod 33 and the bell crank 32 to vertically swing the shaft 27. As there is equal pressure upon both sides of the pinion 26, there will be no relative movement between the gear segments 25 and the pinion, thus the shafts 22 and 23 will be simultaneously rotated in a single direction and the ailerons will be moved through the swinging movement of the levers 21 and 19 and the pitman rods 20. The lever 35 may be then set relative to the member 37 and this will maintain the two wings with a temporary fixed camber.

If, during the performance of the machine it is deemed necessary to simultaneously swing the ailerons in opposite directions to control the machine laterally, this may be done by movement of the lever 30 to produce rotation of the horizontal shaft 29 and the vertically swinging shaft 27. This will cause the gear pinion 26 to rotate, thus swinging one of the gear segments 25 in one direction, and the opposite gear segment in the other direction thus producing opposite rotation of the shafts 22 and 23. This movement, as will be readily understood, actuates the ailerons in opposite directions.

It will thus be seen that the device here disclosed is simple in construction and is not liable to get out of order during its operation, and furthermore provides means whereby the camber of airplane wings may be simultaneously varied at the will of the operator without interferring with the lateral control of the airplane.

While I have shown the preferred form of my invention as now known to me, it will be understood that varied changes may be made in the combination, construction and arrangement of parts by those skilled in the art, without departing from the spirit of the invention, as claimed.

Having thus described my invention, what I claim and desire to secure by Letters Patent, is:

1. In an airplane, a plane, a pair of ailerons mounted at the rear of said plane and disposed one at each end thereof, operating shafts carried by the plane and operatively connected to said ailerons to swing the same when said shafts are rotated, a pair of horizontally disposed aligned rock shafts journaled in the fuselage of the airplane, an operative connection between the outer ends of said rock shafts and said operating shafts whereby turning movement of said rock shafts will impart rotation to said operating shafts to swing the ailerons, a bevel gear segment secured at the inner end of each rock shaft, a bevel pinion interposed between said segments and in mesh therewith, a shaft upon which said pinion is fixed, a lever shaft connected to the pinion shaft to rotate the pinion when said lever shaft is rocked and thereby rotate the rock shafts in opposite directions, and lever operated means for swinging said pinion about the axis of said segments to rotate the rock shafts in the same direction.

2. In an airplane, a plane, a pair of ailerons mounted at the rear of said plane and disposed one at each end thereof, operating shafts carried by the plane and disposed one adjacent each aileron, an operative connection between the adjacent operating shafts and the ailerons whereby turning movement of said shafts will swing the ailerons, a pair of horizontally disposed aligned rock shafts journaled in the fuselage of the airplane, a crank arm at the outer end of each rock shaft, a crank arm on each operating shaft, pitman rods connecting the crank arms of the operating shafts to the crank arms of the rock shafts whereby rotation of the rock shafts will impart turning movement to the operating shafts, a bevel gear segment secured at the inner end of each rock shaft, a bevel pinion disposed between said segments and in mesh therewith, a lever shaft in the fuselage disposed at right angles to the rock shaft, a shaft upon which the pinion is fixed, a universal connection between the lever shaft and the pinion shaft, a lever connected to the lever shaft to rock the same and thereby rotate to turn the rock shafts in opposite directions and thereby swing the ailerons in opposite directions, a second lever in the fuselage, a bell crank pivoted in the fuselage and connected at one end to said lever, a connection between the other end of the bell crank and one end of the pinion shaft whereby movement of the lever will swing the bevel pinion about the axis of the rock shafts to rock said shafts in the same direction and thereby swing said ailerons in the same direction.

In testimony whereof I have hereunto set my hand.

WILLIAM F. HOLEKA.